US012670409B2

(12) United States Patent
Dai et al.

(10) Patent No.: US 12,670,409 B2
(45) Date of Patent: Jun. 30, 2026

(54) SYSTEMS AND METHODS FOR A DISTRIBUTED TRAINING FRAMEWORK USING UNIFORM CLASS PROTOTYPES

(71) Applicant: Salesforce, Inc., San Francisco, CA (US)

(72) Inventors: Yutong Dai, San Francisco, CA (US); Zeyuan Chen, Mountain View, CA (US); Junnan Li, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 824 days.

(21) Appl. No.: 18/064,122

(22) Filed: Dec. 9, 2022

(65) Prior Publication Data

US 2024/0054350 A1     Feb. 15, 2024

Related U.S. Application Data

(60) Provisional application No. 63/398,141, filed on Aug. 15, 2022.

(51) Int. Cl.
G06N 3/098          (2023.01)

(52) U.S. Cl.
CPC ..................................... G06N 3/098 (2023.01)

(58) Field of Classification Search
None
See application file for complete search history.

(56) References Cited

U.S. PATENT DOCUMENTS

| | | | | | |
|---|---|---|---|---|---|
| 2020/0410320 | A1* | 12/2020 | Almazán | ................ | G06V 10/82 |
| 2021/0090095 | A1* | 3/2021 | Sekharan | ................ | G06N 20/00 |
| 2023/0068386 | A1* | 3/2023 | Akdeniz | ................ | G06N 3/084 |
| 2023/0223028 | A1* | 7/2023 | Thakkar | ................ | G10L 15/30 |
| | | | | | 704/270 |

(Continued)

OTHER PUBLICATIONS

Yue Tan, FedProto: Federated Prototype Learning across Heterogeneous Clients, Australian Artificial Intelligence Institute, FEIT, University of Technology Sydney, The Thirty-Sixth AAAI Conference on Artificial Intelligence (Year: 2022).*

(Continued)

*Primary Examiner* — Kamran Afshar
*Assistant Examiner* — Kyle Allman Thompson
(74) *Attorney, Agent, or Firm* — Haynes and Boone, LLP

(57)          ABSTRACT

Embodiments described herein provide systems and methods for federated learning. A central system may store a neural network model which has a body of a number of layers, and a classification layer comprising class prototypes which classifies the latent representations output by the body of the model. The central system may initialize the class prototypes so that they are uniformly distributed in the representation space. The model and class prototypes may be broadcast to a number of client systems, which update the body of the model locally while keeping the class prototypes fixed. The clients may return information to the central system including updated local model parameters, and a local representation of the classes based on the latent representation of items in the local training data. Based on the information from the clients, the neural network model may be updated. This process may be repeated iteratively.

20 Claims, 11 Drawing Sheets

(56) References Cited

U.S. PATENT DOCUMENTS

2024/0177000 A1* 5/2024 Galeotti .................. G06N 3/09

OTHER PUBLICATIONS

McMahan, B.; Moore, E.; Ramage, D.; Hampson, S.; and y Arcas, B. A. 2017. Communication-efficient learning of deep networks from decentralized data. In Artificial intelligence and statistics, 1273-1282. PMLR.

Kang, B.; Xie, S.; Rohrbach, M.; Yan, Z.; Gordo, A.; Feng, J.; and Kalantidis, Y. 2019. Decoupling Representation and Classifier for Long-Tailed Recognition. In International Conference on Learning Representations.

Zhou, B.; Cui, Q.; Wei, X.- S.; and Chen, Z.- M. 2020. Bbn: Bilateral-branch network with cumulative learning for longtailed visual recognition. In Proceedings of the IEEE/CVF conference on computer vision and pattern recognition, 9719-9728.

Arivazhagan, M. G.; Aggarwal, V.; Singh, A. K.; and Choudhary, S. 2019. Federated learning with personalization ayers. arXiv preprint arXiv:1912.00818.

Collins, L.; Hassani, H.; Mokhtari, A.; and Shakkottai, S. 2021. Exploiting shared representations for personalized federated learning. In International Conference on Machine Learning, 2089-2099. PMLR.

Oh, J.; Kim, S.; and Yun, S.-Y. 2021. FedBABU: Toward Enhanced Representation for Federated Image Classification. In International Conference on Learning Representations.

Chen, H.-Y.; and Chao, W.-L. 2021. On Bridging Generic and Personalized Federated Learning for Image Classification. In International Conference on Learning Representations.

Tan, Y.; Long, G.; Liu, L.; Zhou, T.; Lu, Q.; Jiang, J.; and Zhang, C. 2022. Fedproto: Federated prototype learning across heterogeneous clients. In AAAI Conference on Artificial Intelligence, vol. 1, 3.

* cited by examiner

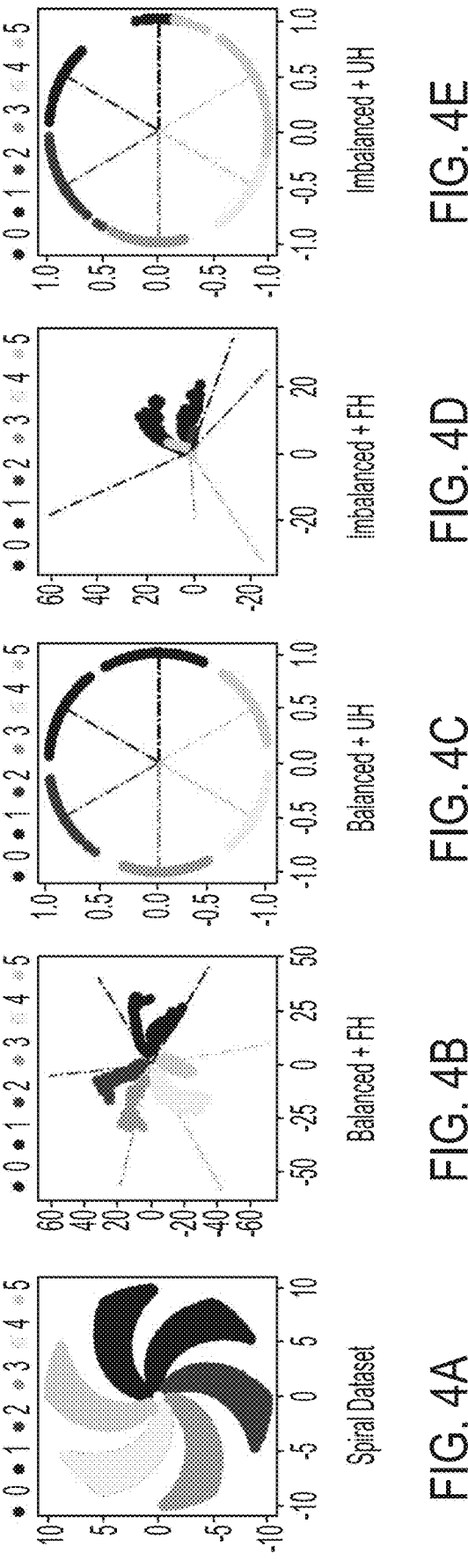
FIG. 4A  Spiral Dataset
FIG. 4B  Balanced + FH
FIG. 4C  Balanced + UH
FIG. 4D  Imbalanced + FH
FIG. 4E  Imbalanced + UH

600

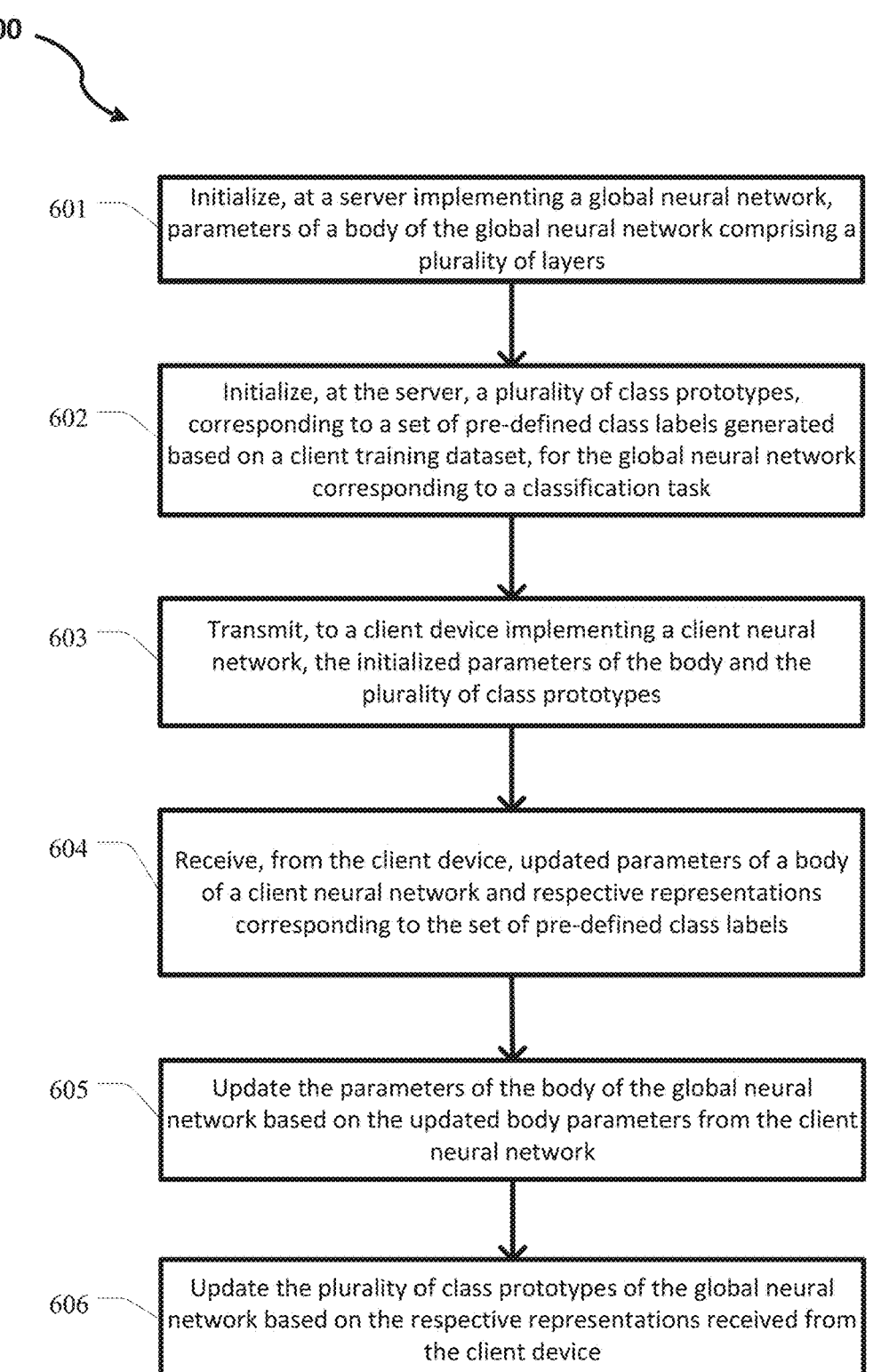

601 — Initialize, at a server implementing a global neural network, parameters of a body of the global neural network comprising a plurality of layers 602 — Initialize, at the server, a plurality of class prototypes, corresponding to a set of pre-defined class labels generated based on a client training dataset, for the global neural network corresponding to a classification task 603 — Transmit, to a client device implementing a client neural network, the initialized parameters of the body and the plurality of class prototypes 604 — Receive, from the client device, updated parameters of a body of a client neural network and respective representations corresponding to the set of pre-defined class labels 605 — Update the parameters of the body of the global neural network based on the updated body parameters from the client neural network 606 — Update the plurality of class prototypes of the global neural network based on the respective representations received from the client device

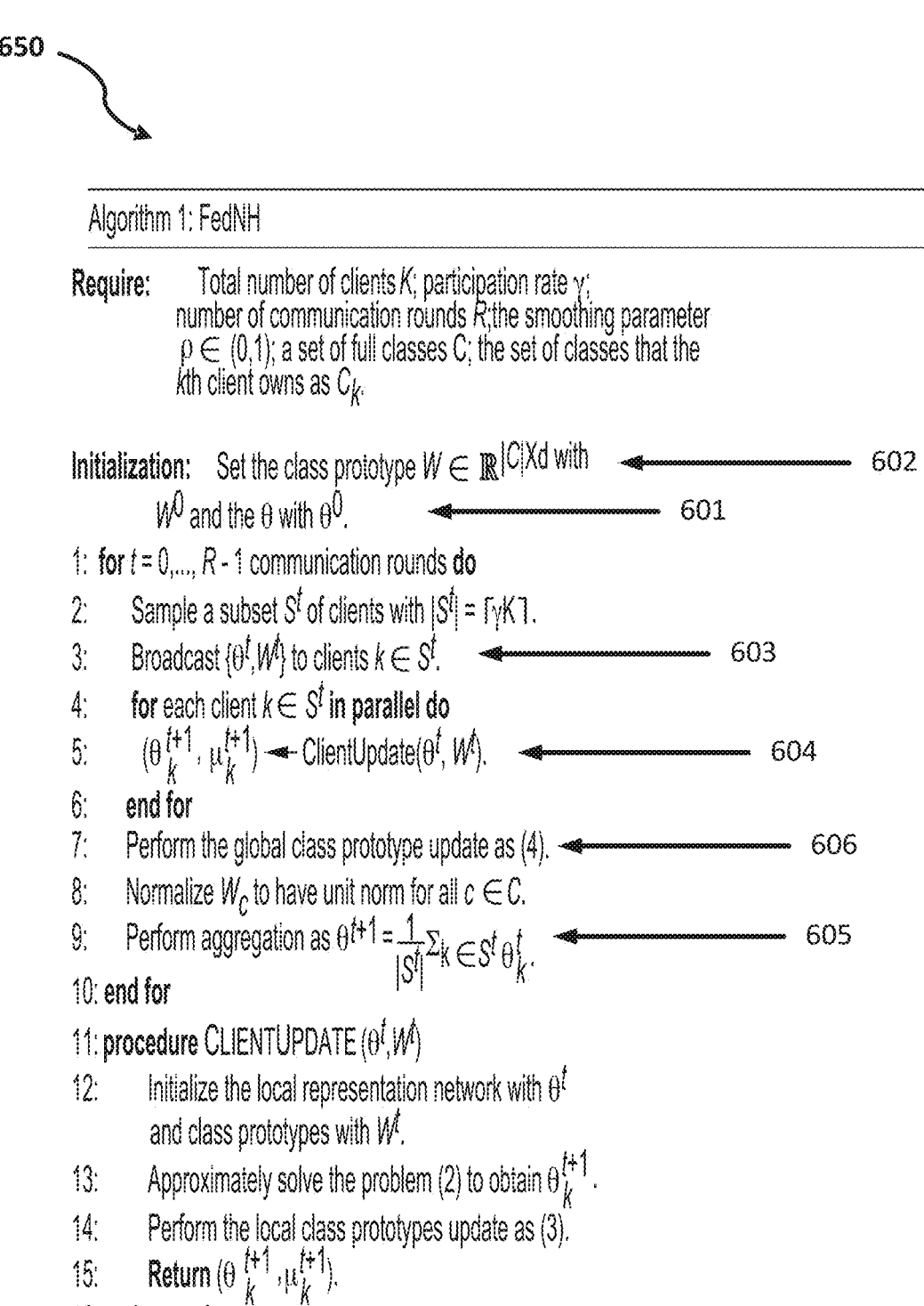

Algorithm 1: FedNH

Require:    Total number of clients $K$; participation rate $\gamma$; number of communication rounds $R$; the smoothing parameter $\rho \in (0,1)$; a set of full classes $C$; the set of classes that the $k$th client owns as $C_k$.

Initialization:    Set the class prototype $W \in \mathbb{R}^{|C| \times d}$ with ◄————— 602
$W^0$ and the $\theta$ with $\theta^0$. ◄————— 601

1: for $t = 0,..., R - 1$ communication rounds do

2:     Sample a subset $S^t$ of clients with $|S^t| = \lceil \gamma K \rceil$.

3:     Broadcast $\{\theta^t, W^t\}$ to clients $k \in S^t$. ◄————— 603

4:     for each client $k \in S^t$ in parallel do

5:         $(\theta_k^{t+1}, \mu_k^{t+1}) \leftarrow$ ClientUpdate($\theta^t, W^t$). ◄————— 604

6:     end for

7:     Perform the global class prototype update as (4). ◄————— 606

8:     Normalize $W_c$ to have unit norm for all $c \in C$.

9:     Perform aggregation as $\theta^{t+1} = \frac{1}{|S^t|} \Sigma_k \in S^t \theta_k^t$. ◄————— 605

10: end for

11: procedure CLIENTUPDATE ($\theta^t, W^t$)

12:     Initialize the local representation network with $\theta^t$ and class prototypes with $W^t$.

13:     Approximately solve the problem (2) to obtain $\theta_k^{t+1}$.

14:     Perform the local class prototypes update as (3).

15:     Return $(\theta_k^{t+1}, \mu_k^{t+1})$.

16: end procedure

FIG. 6B

| Dataset | Method | Dir(0.3) | | | Dir(1.0) | | |
|---|---|---|---|---|---|---|---|
| | | GM | PM(V) | PM(L) | GM | PM(V) | PM(L) |
| Cifar10 | Local | — | 42.79±2.45 | 71.57±1.82 | — | 41.20±1.27 | 58.34±1.03 |
| | FedAvg | 66.40±3.13 | 63.10±1.33 | 84.08±2.31 | 73.07±1.60 | 68.07±1.23 | 79.12±2.11 |
| | FedPer | 61.58±0.43 | 59.66±2.34 | 82.38±1.50 | 63.33±0.53 | 60.66±2.17 | 73.40±1.36 |
| | Ditto | 66.40±3.13 | 53.69±1.11 | 80.08±2.17 | 73.07±1.60 | 61.22±1.77 | 74.78±2.16 |
| | FedRep | 40.13±0.17 | 56.47±2.31 | 80.22±2.45 | 47.92±0.38 | 55.06±2.27 | 68.99±1.27 |
| | FedProto | — | 41.48±1.02 | 68.35±1.75 | — | 39.65±1.33 | 53.23±1.78 |
| | CReFF | 66.46±1.40 | 63.10±2.16 | 84.08±2.31 | 71.63±0.61 | 68.07±1.44 | 79.12±2.11 |
| | FedBABU | 62.78±3.09 | 60.58±2.16 | 82.64±1.03 | 70.34±1.72 | 65.49±1.44 | 77.35±1.80 |
| | FedROD | 72.31±0.16 | 65.66±1.27 | 83.44±1.03 | 75.50±0.15 | 69.18±1.98 | 77.84±1.76 |
| | FedNH | 69.01±2.51 | 65.02±1.23 | 84.63±2.11 | 75.34±0.86 | 69.64±1.15 | 79.53±2.14 |
| Cifar100 | Local | — | 13.63±2.45 | 30.89±1.82 | — | 9.44±1.27 | 16.71±1.03 |
| | FedAvg | 35.14±0.48 | 31.85±1.33 | 50.77±2.31 | 36.07±0.41 | 28.86±1.23 | 38.35±2.11 |
| | FedPer | 15.04±0.06 | 16.15±2.34 | 33.10±1.50 | 14.69±0.03 | 11.61±2.17 | 19.08±1.36 |
| | Ditto | 35.14±0.48 | 26.19±1.11 | 45.91±2.17 | 36.07±0.41 | 22.92±1.77 | 32.81±2.16 |
| | FedRep | 5.42±0.03 | 13.59±2.31 | 29.45±2.45 | 6.37±0.04 | 9.47±2.27 | 16.07±1.27 |
| | FedProto | — | 10.64±1.02 | 19.11±1.75 | — | 9.24±1.33 | 12.61±1.78 |
| | CReFF | 22.90±0.30 | 31.85±1.33 | 50.77±2.31 | 22.21±0.15 | 28.86±1.23 | 38.35±2.11 |
| | FedBABU | 32.41±0.40 | 28.96±2.16 | 47.86±1.03 | 32.34±0.49 | 25.84±1.44 | 34.85±1.80 |
| | FedROD | 33.83±0.25 | 28.53±1.27 | 42.93±1.03 | 35.20±0.19 | 27.58±1.98 | 33.44±1.76 |
| | FedNH | 41.34±0.25 | 38.25±1.23 | 55.21±2.11 | 43.19±0.24 | 36.88±1.15 | 45.46±2.14 |
| TinyImageNet | Local | — | 7.55±2.45 | 19.94±1.82 | — | 5.10±1.27 | 9.93±1.03 |
| | FedAvg | 34.63±0.26 | 27.35±1.33 | 44.97±2.31 | 37.65±0.37 | 28.82±1.23 | 37.15±2.11 |
| | FedPer | 15.28±0.14 | 13.84±2.34 | 30.72±1.50 | 13.71±0.07 | 9.82±2.17 | 17.05±1.36 |
| | Ditto | 34.63±0.26 | 23.85±1.11 | 42.67±2.17 | 37.65±0.37 | 24.97±1.77 | 34.70±2.16 |
| | FedRep | 3.27±0.02 | 9.24±2.31 | 22.86±2.45 | 3.91±0.03 | 5.76±2.27 | 10.86±1.27 |
| | FedProto | — | 5.17±1.02 | 10.44±1.75 | — | 4.21±1.33 | 6.34±1.78 |
| | CReFF | 25.82±0.41 | 27.35±1.33 | 44.97±2.31 | 27.87±0.38 | 28.82±1.23 | 37.15±2.11 |
| | FedBABU | 26.36±0.32 | 20.85±2.16 | 37.96±1.03 | 30.25±0.32 | 22.74±1.44 | 31.01±1.80 |
| | FedROD | 36.46±0.28 | 28.23±1.27 | 45.26±1.03 | 37.71±0.31 | 29.65±1.98 | 38.43±1.76 |
| | FedNH | 36.71±0.36 | 30.99±1.23 | 46.14±2.11 | 38.68±0.30 | 30.58±1.15 | 38.25±2.14 |

FIG. 7

| | Cifar10 | Cifar100 | TinyImageNet |
|---|---|---|---|
| Local | 71.57 ± 10.13 | 30.89 ± 4.60 | 19.94 ± 3.27 |
| FedAvg | 84.08 ± 6.80 | 50.77 ± 4.23 | 44.97 ± 2.99 |
| FedPer | 82.38 ± 6.38 | 33.10 ± 4.26 | 30.72 ± 3.21 |
| Ditto | 80.08 ± 7.83 | 45.91 ± 4.10 | 42.67 ± 3.05 |
| FedRep | 80.22 ± 7.06 | 29.45 ± 4.19 | 22.86 ± 3.20 |
| FedProto | 68.35 ± 11.03 | 19.11 ± 4.17 | 10.44 ± 2.80 |
| FedBABU | 82.64 ± 6.11 | 47.86 ± 3.89 | 37.96 ± 2.79 |
| FedROD | 83.44 ± 5.89 | 42.93 ± 4.10 | 45.26 ± 2.72 |
| FedNH | 84.63 ± 5.61 | 55.21 ± 3.91 | 46.14 ± 2.70 |

FIG. 9

SYSTEMS AND METHODS FOR A DISTRIBUTED TRAINING FRAMEWORK USING UNIFORM CLASS PROTOTYPES

CROSS REFERENCE(S)

The instant application is a nonprovisional of and claim priority under 35 U.S.C. 119 to U.S. provisional application No. 63/398,141 filed Aug. 15, 2022, which is hereby expressly incorporated by reference herein in its entirety.

TECHNICAL FIELD

The embodiments relate generally to machine learning systems, and more specifically to systems and methods for a distributed training framework for a plurality of learning models using uniform class prototypes.

BACKGROUND

Machine learning systems have been widely used in classification tasks, such as classifying the contents of an image, an intent of a user utterance, and/or the like. Federated learning (FL) and analytics is a distributed approach for collaboratively learning models (or statistics) from decentralized data. Depending on the implementation, benefits of FL may include data privacy. In FL, a global model is stored on a central server, and deployed to a number of clients. Each client may adapt a personalized model from the global model for a client specific task. The personalized model may be aggregated to update the global model at the central server. However, clients may have different data distributions, known as the data heterogeneity issue, which may result in degraded training performance and may result in a non-optimal global model. For example, in image classification, one client may have more training image data relating to "apples," rendering the model to be heavily biased to the "apple" class in the task of fruit type classification.

BRIEF DESCRIPTION OF THE DRAWINGS

FIGS. 4A-4E illustrate exemplary training data and learned class representations according to some embodiments.

FIG. 6A provides an example logic flow diagram illustrating an example algorithm for a method of federated learning according to some embodiments described herein.

FIG. 6B provides an example pseudo-code segment illustrating a method of federated learning according to some embodiments described herein.

FIGS. 7-9 provide charts illustrating exemplary performance of different embodiments described herein.

Figure 1:
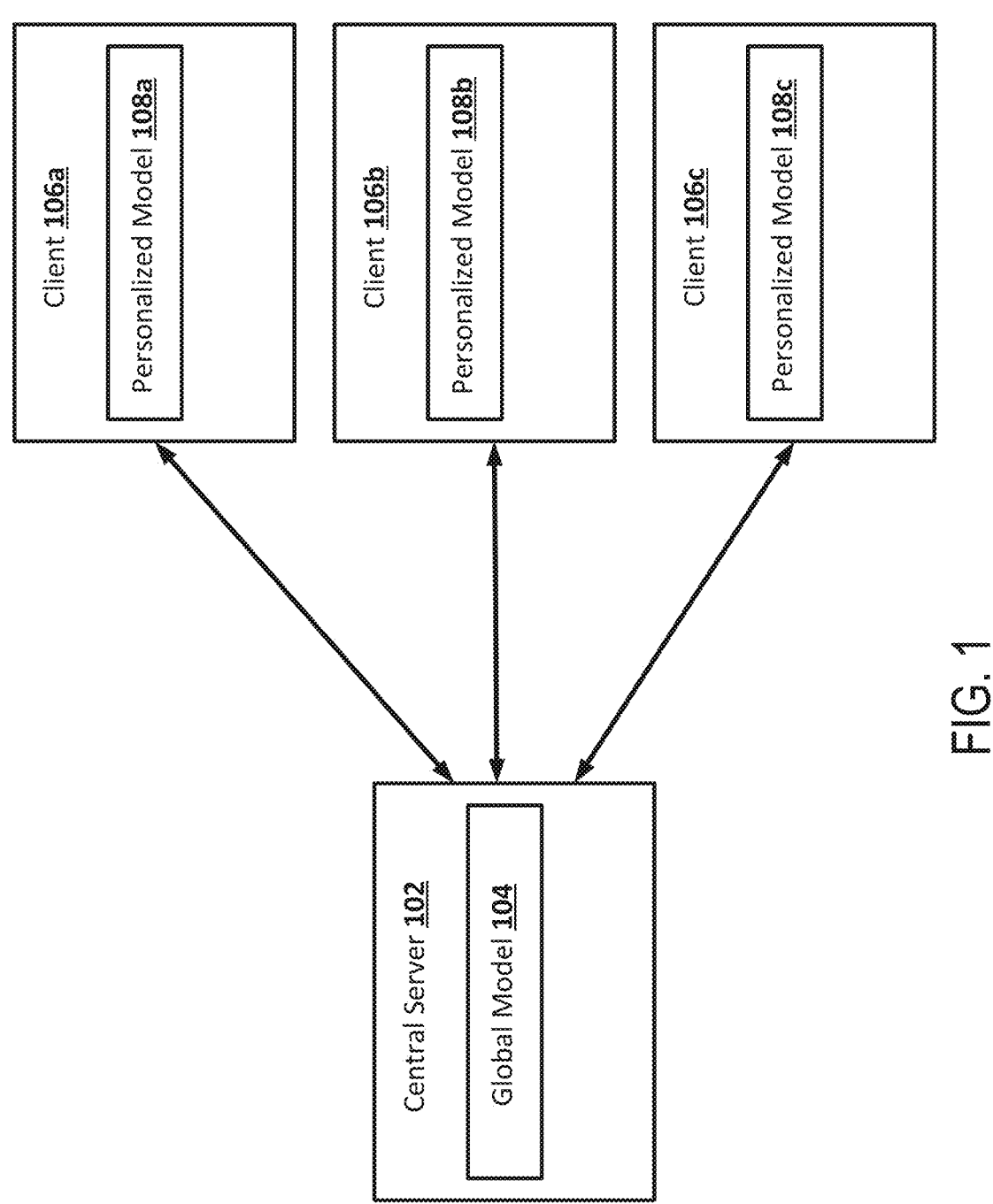
FIG. 1 is a simplified diagram illustrating a federated learning framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "head (of a neural model)" refers to parameters in the last linear layer of the neural network, used as a prototype for a classification task. The term "class head" and "class prototype" may be used interchangeably throughout the application.

Federated learning (FL) and analytics is a distributed approach for collaboratively learning models (or statistics) from decentralized data. Such a framework often has a server-client structure in which a global model is stored on a central server, and a number of personalized models are deployed at a number of clients, respectively. Each client may update their respective personalized model locally, and personalized model changes may be aggregated to update the global model at the central server. For data privacy concerns, each individual client may not wish to share their private data to the centralized network.

One critical challenge in FL compared with centralized machine learning is the data heterogeneity problem. Specifically, each client may only hold a small amount of data and the data distributions often vary drastically from one client to another. For example, in the multi-class classification problem, different clients may have different dominate classes. Even worse, a client may not possess samples from some classes at all. Such a class imbalance issue results in biased local models with dominate classes, which causes server performance degradation compared with the centralized training.

Overview

In view of the data privacy and data heterogeneity concerns in FL, embodiments described herein provide a federated learning framework (referred to as "FedNH"—nonparametric head) that shares class prototypes among a global model at a central server and distributed client models, where the class prototypes are used to combat the data heterogeneity problem with an emphasis on class imbalance.

Specifically, in the FedNH framework, a central server may initialize the head of a global classification model, maximizing the distance between classes. The central server may send parameters of the model (decomposed into the body and head) to each client, each of which may update their local classification model according to the initialized parameters.

Next, during local training, the classification head at each local model may be fixed, so that each client has a consistent learning goal under the guidance of the same head. Once local training is done, or with some frequency, the client may compute and send averaged class representations and learned body parameters to the central server. The central server may update the global model based on aggregating information from all or a subset of active clients at a given communication interval. For example, body parameters may be averaged together, and class prototypes may be updated to align more closely with the averaged class representations.

Next, the updated global model parameters (body and head) may again be sent to active clients. Using the updated body parameters as the initialization point for the local training, each client may benefit from the collective knowledge without exposing private data to other clients.

Further, updating class prototypes of the global model based on the averaged class representations learned by each client helps to infuse class semantics into the class prototypes. For example, the (wolf, dog) pair is more similar than the (wolf, plant) pair. After the local training is done, each client's learned local model can extract useful latent representations of each class from its private data. These representations from each class serve as a proxy to measure the semantic similarity of classes. For example, the latent representation of a "wolf" data point may be closer in the representation space to the "dog" class prototype than the "plant" class prototype. By aggregating latent representations of items within a class and returning that to the central server, the central server may update the global class prototypes to reflect those learned semantics. Therefore, by fixing class prototypes during local training, while updating the class prototypes in the global model based on learned representations at each client, FedNH strikes a balance between uniformity and class semantics so that similar class prototypes are closer together, which improves performance of the model.

Embodiments described herein provide a number of benefits. For example, enforcing uniformity over the class prototypes in the way described herein does may not require tuning any parameters, which is required in alternative methods. Further, the class uniformity brings additional benefits to the minority classes, whose representations are no longer overlapped with the majority classes. Furthermore, fixing class prototypes sets a consistent learning goal for clients. In this way, the distributed framework improves training performance of both the centralized global model and each individual client model, while preserving data privacy, e.g., training data at each individual client does not need to be shared due to privacy concerns.

FIG. 1 is a simplified diagram illustrating a federated learning framework according to some embodiments. The framework comprises a central server 102, which holds a global model 104. The framework also includes clients 106a, 106b, and 106c which each have a respective personalized model 108a, 108b, and 108c. The clients are each connected to the central server either locally or through some network interface (e.g., data interface 265 in FIG. 2B, network interface 317 in FIG. 3). Greater or fewer clients may be included in a federated learning system as discussed herein. Central server 102 initializes global model 104. Central server 102 may initialize the classification head of global model 104 such that classes are uniformly distributed in representation space.

Global model 104 is transmitted to each of the clients 106. At each client 106, the body of the model is updated, while keeping the head fixed, resulting in each personalized model 108. Clients 106 may periodically, or upon a request by central server 102, report back local information such as updated model parameters and/or averaged class representations. Central server 102 may update global model 104 based on these inputs from clients 106.

The general description above may be formalized, with additional details as follows. For a neural network, its parameters may be decomposed into the body, parameterized by θ, and the head, parameterized by W. The body is used to learn the abstract representation of inputs, and the head is used for classification. The output of a neural network can be written as $Wf(\theta;\cdot)$, where the second argument is a placeholder for an input. In some embodiments, solely the last linear layer is the head. The terms head and prototype are used interchangeably herein as they both refer to parameters of the last linear classification layer of the neural network. The term head is often used in discussing the neural network's architecture, while the term prototype appears more often when discussing the classification task.

The server (e.g., central server 102 of FIG. 1) is responsible for initializing parameters for both the body and classification head of the global model (e.g., global model 104 of FIG. 1). The parameters for the body may be initialized using a number of different techniques. In some embodiments, the parameter W for the head is initialized in a way so that they are maximally separated and equidistant.

Specifically, assuming there are $\mathcal{C}$ classes and the latent representation lives in a d-dimensional space, then one can solve a constrained optimization problem (1).

$$\max_{\{w_1,\ldots,w_{|\mathcal{C}|},M\}} M^2 \tag{1}$$

$$\text{s.t. } \|w_i - w_j\|^2 \geq M^2, \|w_i\|^2 = 1 \text{ for all } i \in [\,|C|\,], i \neq j.$$

The first constraint is imposed to satisfy the maximally separated and equidistant requirements, while the second constraint is added to ensure all class prototypes are of the same magnitude. The problem can be solved by, for example, the interior point method. When d and $|\mathcal{C}|$ are large, the computation cost might be high. However, the computation only needs to be performed once at the initialization stage and saved for future uses. In some embodiments, the body of the network internally adds a normalization layer to its output such that $\|f(\theta; x)\|=1$ for any θ and valid input x. This normalization technique adds no extra parameters and negligible computation cost.

For communication round t, the client k (e.g., a client 106 of FIG. 1) receives the body parameter $\theta^t$ and the head parameter $W^t$. Together with its local training dataset $D_k$, it aims to achieve two goals. The first goal is to learn a strong body of a local model (e.g., personalized model 108 of FIG. 1) that can extract representations used for classification. To this goal, the kth client approximately solves the problem (2).

$$\theta_k^{t+1} \approx \tag{2}$$

$$\underset{\theta}{\text{argmin}} \left[ F(\theta; D_k, W^t, s) := \frac{1}{|D_k|} \sum_{(x_i,y_i)\in D_k} -\log \frac{\exp(s \cdot f(\theta; x_i)^T W_{y_i}^t)}{\sum_{j=1}^{|C|} \exp(s \cdot f(\theta; x_i)^T W_j^t)} \right],$$

where s is a fixed constant scalar. The s is added to compensate for the fact that $$\|f(\theta; x_i)^T W_{y_i}^t\| \leq 1.$$

5

Specifically, the loss F(θ; $D_k W^t$, s) is lower bounded by a quantity inversely proportional to $$s \cdot \left\| f(\theta; x_i)^T W_{y_i}^t \right\|. \text{ If } s = 1,$$

it hinders the optimization process of learning a strong body. In practice, s can be set to some constants like 30.

To approximately solve problem (2), J steps of stochastic gradient descent may be performed, i.e., $$\theta_k^{t,j} = \theta_k^{t,j-1} - \eta_t G_k(\theta_k^{t,j-1}; W^t) \text{ for } j \in [J],$$

where $$\theta_k^{t,j}$$

is the body parameter at the kth client in tth communication round and after the jth local update, and $G_k$ is the stochastic gradient estimator. It is clear that $$\theta_k^{t,J} = \theta_k^t$$

and $$\theta_k^{t,0} = \theta^{t-1}.$$

As discussed above, the classification head is fixed during the local training so that all selected clients have a consistent learning goal under the guidance of the same head $W^t$.

Once the local training is done, the client completes its second goal, i.e., computing the averaged representations per $\mathcal{C}$ k as (3)

$$\mu_{k,c}^{t+1} = \begin{cases} \frac{1}{|\{i: y_i = c\}|} \sum_{i:y_i=c} r_{k,i}^{t+1}, & \text{if} \in C_k. \\ 0, & o.w., \end{cases}$$

where $\mathcal{C}_k$ is the set of classes that the kth client owns and $$r_{k,i}^{t+1} = f(\theta_k^{t+1}; x_i, y_i)$$

for $(x_i, \gamma_i) \in D_k$. These averaged representations $$\{\mu_{k,c}^{t+1}\}_{c \in C_k}$$

provide a succinct local description of class prototypes for classes from $\mathcal{C}$ k. While the averaged representations will generally have similar values to the corresponding class prototypes, they are distinct, and the local training is done with respect to the class prototypes, not the averaged representations, which are used as feedback to the central server. Finally, both the body parameters $$\theta_k^{t+1}$$

and local prototypes (averaged representations)

$$\{\mu_{k,c}^{t+1}\}_{c \in C_k}$$

are sent back to the server for aggregation.

For the tth communication round, assume that clients from a set $\mathcal{S}^t$ respond to the server. Then the server aggregates the body by taking the average of the received $$\{\theta_k^{t+1}\}_{k \in S^t}.$$

However, for the global prototype update, a strategy may be used that infuses class semantics, addressing the second question. Specifically, for $c \in \mathcal{C}$, $$W_c^{t+1} \leftarrow pW_c^t + (1-p)\sum_{k \in S^t} \alpha_k^{t+1} \mu_{k,c}^{t+1}, \tag{4}$$

where the aggregation weights $$\{\alpha_k^{t+1}\}_{k \in S^t}$$

are positive and with smoothing parameter $\rho \in (0,1)$. Note that ρ is suggested to be set close to 1 for two reasons. First, at the initial training stage, the body of a network is not well trained; hence the learned representations and the clients' proposed prototypes are less informative. In this stage, the uniformity prototypes initialized at the server may be used to guide the local training. Second, due to the client sampling, it is ideal that prototypes at the server side changes gradually, hence using the 1−ρ to discount the contribution of local clients to the update of prototypes at the server side. Note that class prototypes are updated in a non-parametric manner instead of by gradients.

Computer and Network Environment

Figure 2A:
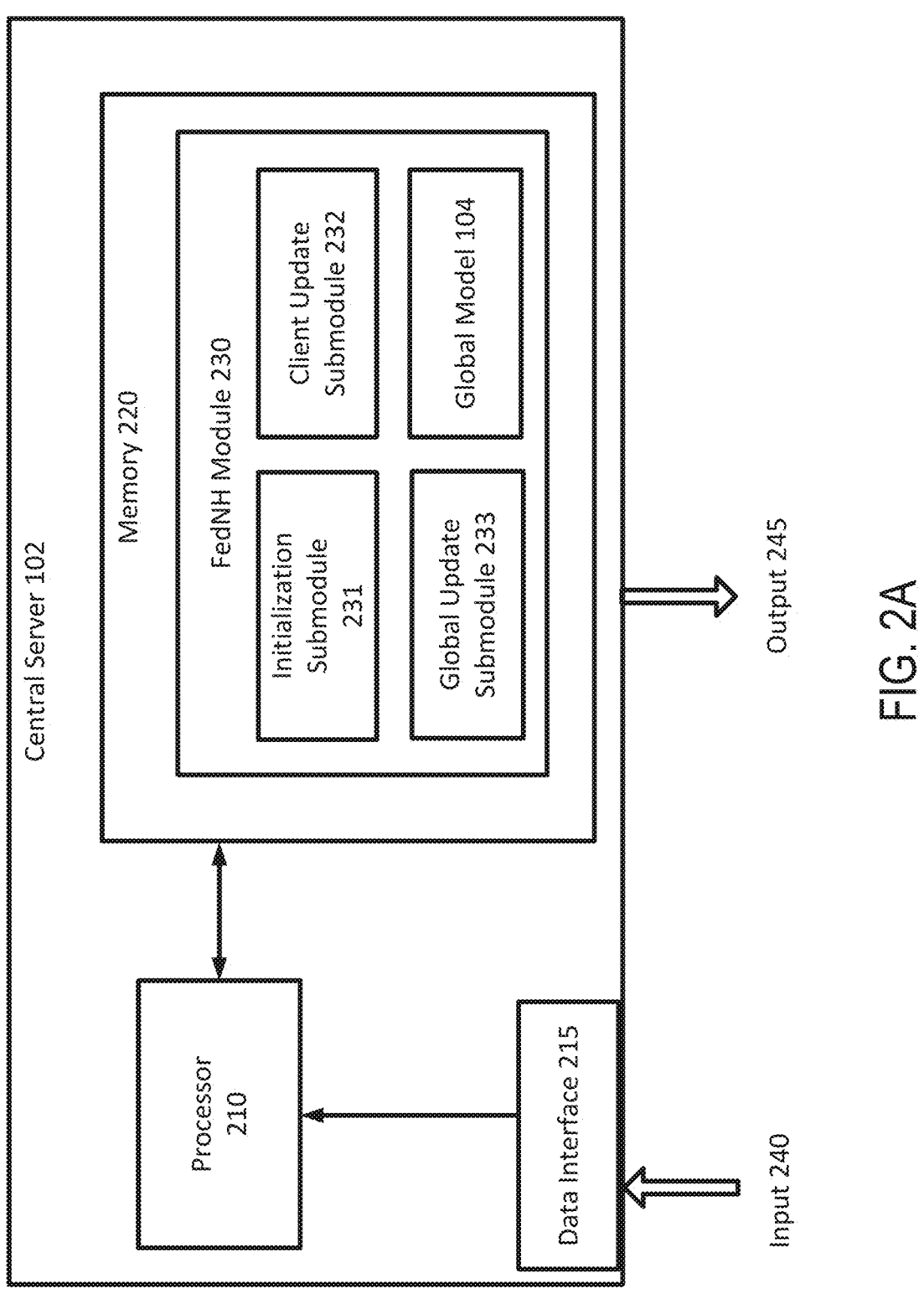
FIG. 2A is a simplified diagram illustrating a central server according to some embodiments.

FIG. 2A is a simplified diagram illustrating a central server 102 implementing the federated learning framework described herein. As shown in FIG. 2A, central server 102 includes a processor 210 coupled to memory 220. Operation of central server 102 is controlled by processor 210. And although central server 102 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in central server 102. Central server 102 may be implemented as a stand-alone subsystem, as a board added to a computing device, and/or as a virtual machine.

Memory 220 may be used to store software executed by central server 102 and/or one or more data structures used during operation of central server 102. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for FedNH module 230 that may be used to implement and/or emulate the systems and models, and/or to implement any of the methods described further herein. FedNH module 230 may receive input 240 such as an input training data for training a baseline global model, identified classes, etc., via the data interface 215. FedNH module 230 may generate an output 245 which may be a classification of an input, model parameters (body and head) which may be sent to a client system 106, which may also be sent via data interface 215.

The data interface 215 may comprise a communication interface, a user interface (such as a voice input interface, a graphical user interface, and/or the like). For example, the computing device 200 may receive the input 240 (such as a training dataset) from a networked database via a communication interface. Or the computing device 200 may receive the input 240 from a user via the user interface.

In some embodiments, the FedNH module 230 is configured to train a global model 104 as described herein, especially with respect to FIG. 1. The FedNH module 230 may further include an initialization submodule 231. Initialization submodule 231 may be configured to initialize the global model 104 as described herein. The FedNH module 230 may further include a client update submodule 232. Client update submodule 232 may be configured to select and communicate with client systems 106, communicating parameters and receiving information from client systems 106 as described herein. The FedNH module 230 may further include a global update submodule 233. Global update submodule 233 may be configured to update the global model based on aggregated feedback from clients as described herein. In one embodiment, the FedNH module 230, its submodules 231-233, and global model 104 may be implemented by hardware, software and/or a combination thereof.

Some examples of computing devices, such as central server 102 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2B:
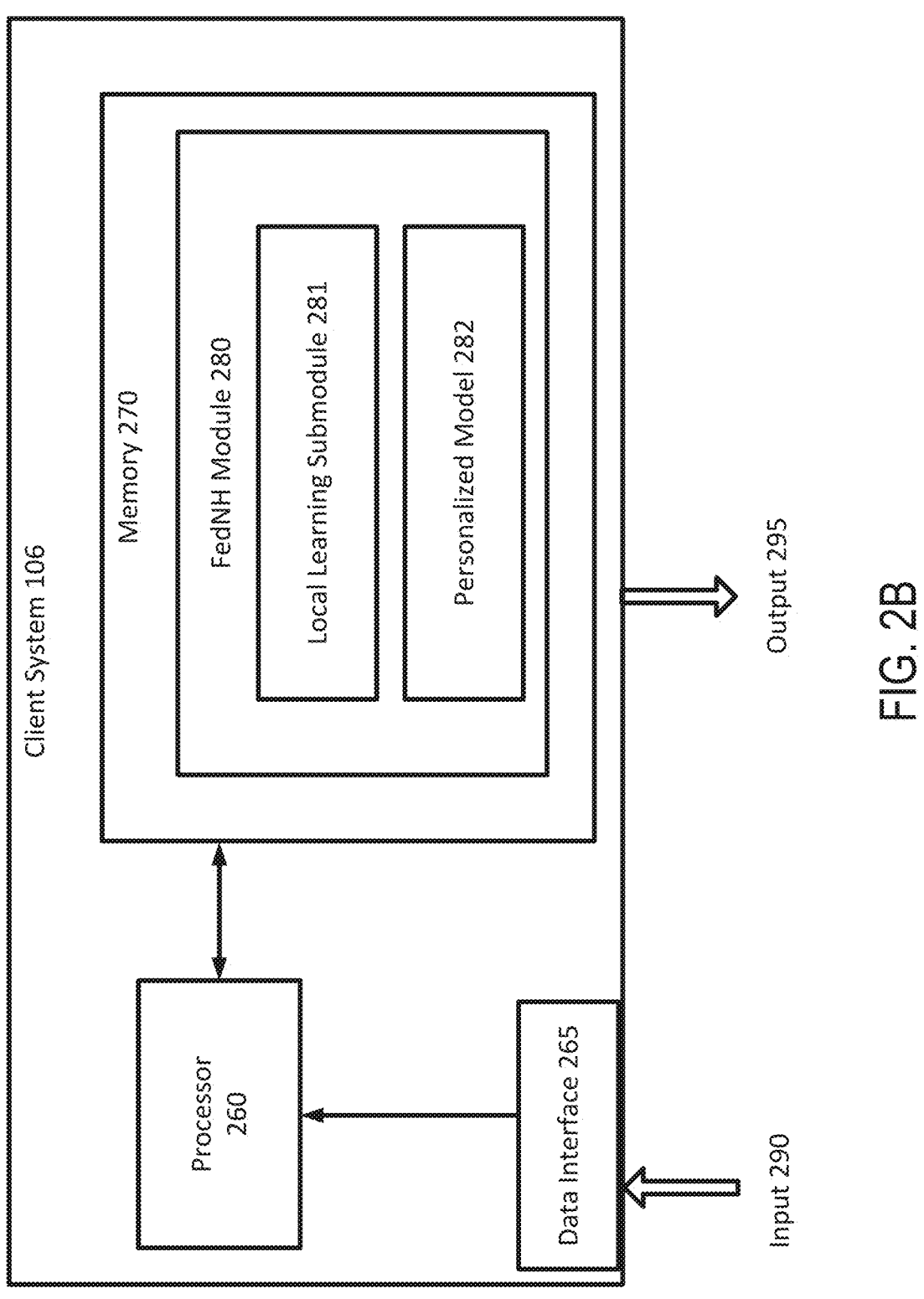
FIG. 2B is a simplified diagram illustrating a client system according to some embodiments.

FIG. 2B is a simplified diagram illustrating a client system 106 implementing the federated learning framework described herein. As shown in FIG. 2B, client system 106 includes a processor 260 coupled to memory 270. Operation of client system 106 is controlled by processor 260. And although client system 106 is shown with only one processor 260, it is understood that processor 260 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in client system 106. Client system 106 may be implemented as a stand-alone subsystem, as a board added to a computing device, and/or as a virtual machine.

Memory 270 may be used to store software executed by client system 106 and/or one or more data structures used during operation of client system 106. Memory 270 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 260 and/or memory 270 may be arranged in any suitable physical arrangement. In some embodiments, processor 260 and/or memory 270 may be implemented on a same board, in a same package (e.g., system-in-package), on a same chip (e.g., system-on-chip), and/or the like. In some embodiments, processor 260 and/or memory 270 may include distributed, virtualized, and/or containerized computing resources. Consistent with such embodiments, processor 260 and/or memory 270 may be located in one or more data centers and/or cloud computing facilities.

In some examples, memory 270 may include non-transitory, tangible, machine readable media that includes executable code that when run by one or more processors (e.g., processor 260) may cause the one or more processors to perform the methods described in further detail herein. For example, as shown, memory 270 includes instructions for FedNH module 280 that may be used to implement and/or emulate the systems and models, and/or to implement any of the methods described further herein. FedNH module 280 may receive input 290 such as an input training data for training a personalized model 282, and/or may receive model parameters from a central server 102, via the data interface 265. FedNH module 280 may generate an output 295 which may be updated parameters of the body of personalized model 282 after local training, and may include aggregated data related to classes as described herein, which may be communicated to a central server 102 via data interface 265.

The data interface 265 may comprise a communication interface, a user interface (such as a voice input interface, a graphical user interface, and/or the like). For example, the computing device 200 may receive the input 290 (such as a training dataset) from a networked database via a communication interface. Or the computing device 200 may receive the input 290 from a user via the user interface.

In some embodiments, the FedNH module 280 includes a personalized model 282, which is trained by local learning submodule 281. Personalized model 282 may be updated periodically based on a global model as transmitted by a central server 102 as described herein. After a local learning iteration, parameters and aggregated information may be communicated back to the central server 102 as described herein. In one embodiment, the FedNH module 280, its submodule 281, and personalized model 282 may be implemented by hardware, software and/or a combination thereof.

Some examples of computing devices, such as client system 106 may include non-transitory, tangible, machine readable media that include executable code that when run by one or more processors (e.g., processor 260) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
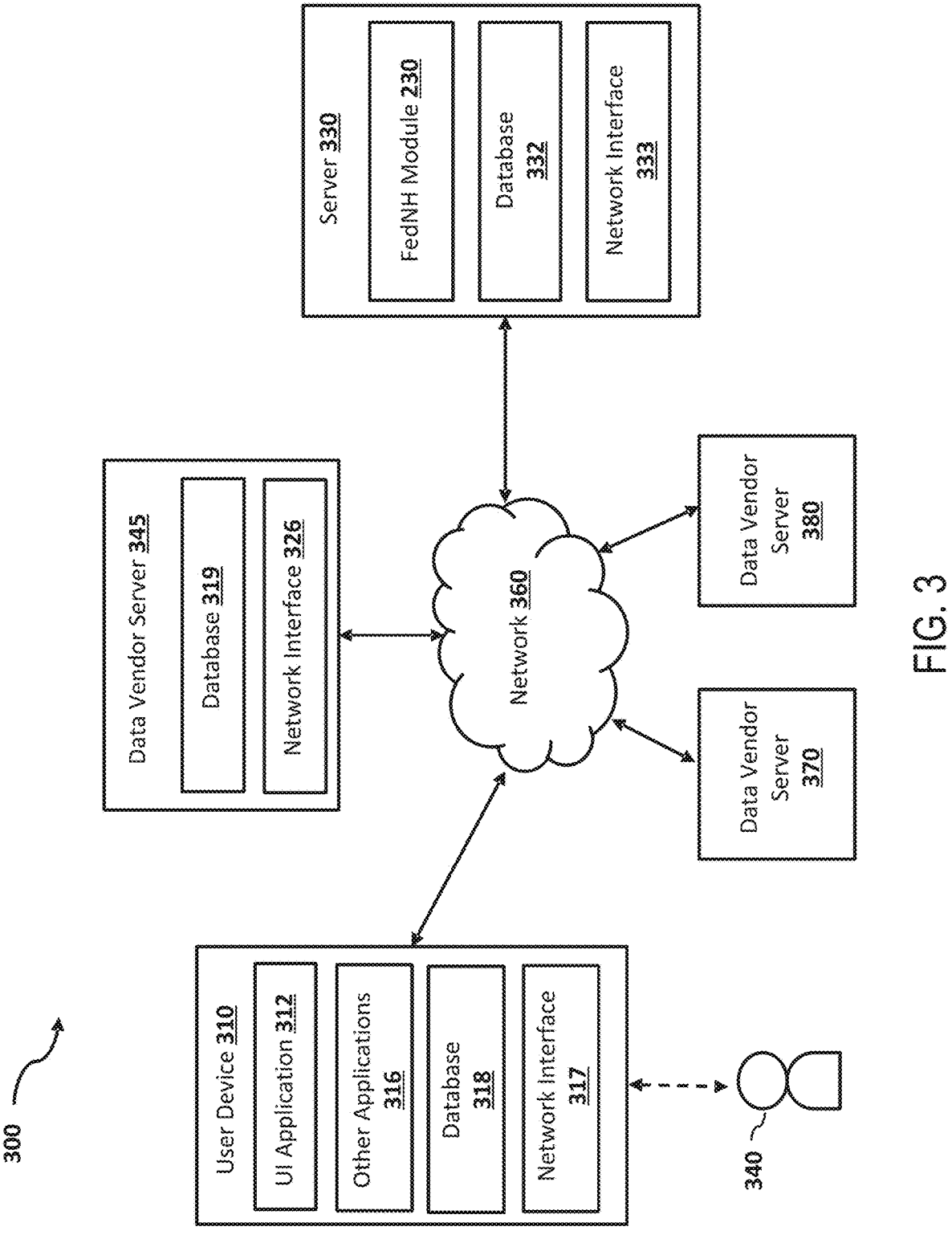
FIG. 3 is a simplified block diagram of a networked system suitable for implementing the federated learning framework described herein.

FIG. 3 is a simplified block diagram of a networked system suitable for implementing the FedNH framework described in FIGS. 1-2 and other embodiments described herein. In one embodiment, block diagram 300 shows a system including the user device 310 which may be operated by user 340, data vendor servers 345, 370 and 380, server 330, and other forms of devices, servers, and/or software components that operate to perform various methodologies in accordance with the described embodiments. Exemplary devices and servers may include device, stand-alone, and enterprise-class servers which may be similar to the central server 102 described in FIG. 2A, client device 106 described in FIG. 2B, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data vendor servers 345, 370 and 380, and the server 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report. In some embodiments, user device 310 is a client 106 as discussed with respect to FIG. 1 and FIG. 2B.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be operated as one of the client devices 106*a-c* shown in FIG. 1. User device 310 may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message indicating model parameters from the server 330 and display the message via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include a personalized client model 108 as shown in FIG. 1. Additional other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view training or classification information.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with data vendor server 345 and/or the server 330. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 may correspond to a server that hosts database 319 to provide training datasets including items and identified classes to the server 330. The database 319 may be implemented by one or more relational database, distributed databases, cloud databases, and/or the like.

The data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 319, via the network interface 326, to the server 330.

The server 330 may be housed with the FedNH module 230 and its submodules described in FIG. 2A. In some embodiments, server 330 is a central server 102 as discussed with respect to FIGS. 1-2A. In some implementations, FedNH module 230 may receive data from database 319 at the data vendor server 345 via the network 360 to generate model parameters. The generated model parameters may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the FedNH module 230. In one implementation, the database 332 may store previously generated classifications, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370 or 380 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Example Embodiments

FIGS. 4A-4E illustrate exemplary training data and learned class representations according to some embodiments. Specifically, FIG. 4A illustrates a synthetic balanced training dataset, where each dot represents a training data point in some representation space, and the shade of the point illustrates the class to which it belongs. Note that the classes are "balanced" since each class has the same (or approximately the same) number of training data points. In an actual data set derived from user data, classes are not likely to be balanced, and the amount of data in each class may vary widely from user to user. In the example of pictures classified by the contents of the pictures, one client may take many pictures of dogs, while another may take many pictures of cats.

FIG. 4B illustrates latent representations (dots) in a latent representation space which were output by the body of a neural network which was trained on a balanced training set such as the one in FIG. 4A, but without fixing the classification head (class prototypes) at each client learning phase. The latent representations illustrated here would be used as inputs to the classification head (class prototypes) in order to classify the points. The outer end-points of each of the dashed lines represent the location of each class prototype in the latent space. The closer a point is to a class prototype, the more likely it belongs to that class. Even though the class prototypes are not fixed during client training, as the points in FIG. 4B are output by a neural network trained using a balanced dataset, each class uses roughly the same amount of the representation space.

FIG. 4C illustrates latent representations (dots) in a latent representation space which were output by the body of a neural network which was trained on a balanced training set, with a "uniform head" (i.e., fixed class prototypes). In FIG. 4C, representations have also been normalized, resulting in each representation being placed on a circle. As the class prototypes are fixed at uniform locations, the dashed lines representing their locations are equidistant around the normalized circle. As the training dataset was balanced, the representations each use roughly the same amount of the representation space, centered around their respective class prototypes.

FIG. 4D illustrates the results of training with training data that has imbalanced classes (e.g., more cat pictures than dog pictures), with a "free head" (i.e., class prototypes are not fixed). The dominant class (the class associated with more training data) begins to dominate the representation space. Effectively, as the model has been trained mostly with that class, it has learned that it may more accurately predict by tending to classify inputs with that class. However, the non-dominant classes have suffered, and are compressed, and would therefore have less accuracy since the model has less of the representation space with which to distinguish them.

FIG. 4E illustrates latent representations which are output by a neural network body which is trained on an imbalanced training dataset, but with a uniform head (i.e., fixed class prototypes). In this case, even though there was a dominant class, by fixing its class prototype during the training phase (at least for the client training phase), that class was not able to dominate in the representation space, and the model has maintained the ability to distinguish well even among non-dominant classes.

Figures 5A, 5B, 5C, 5D:
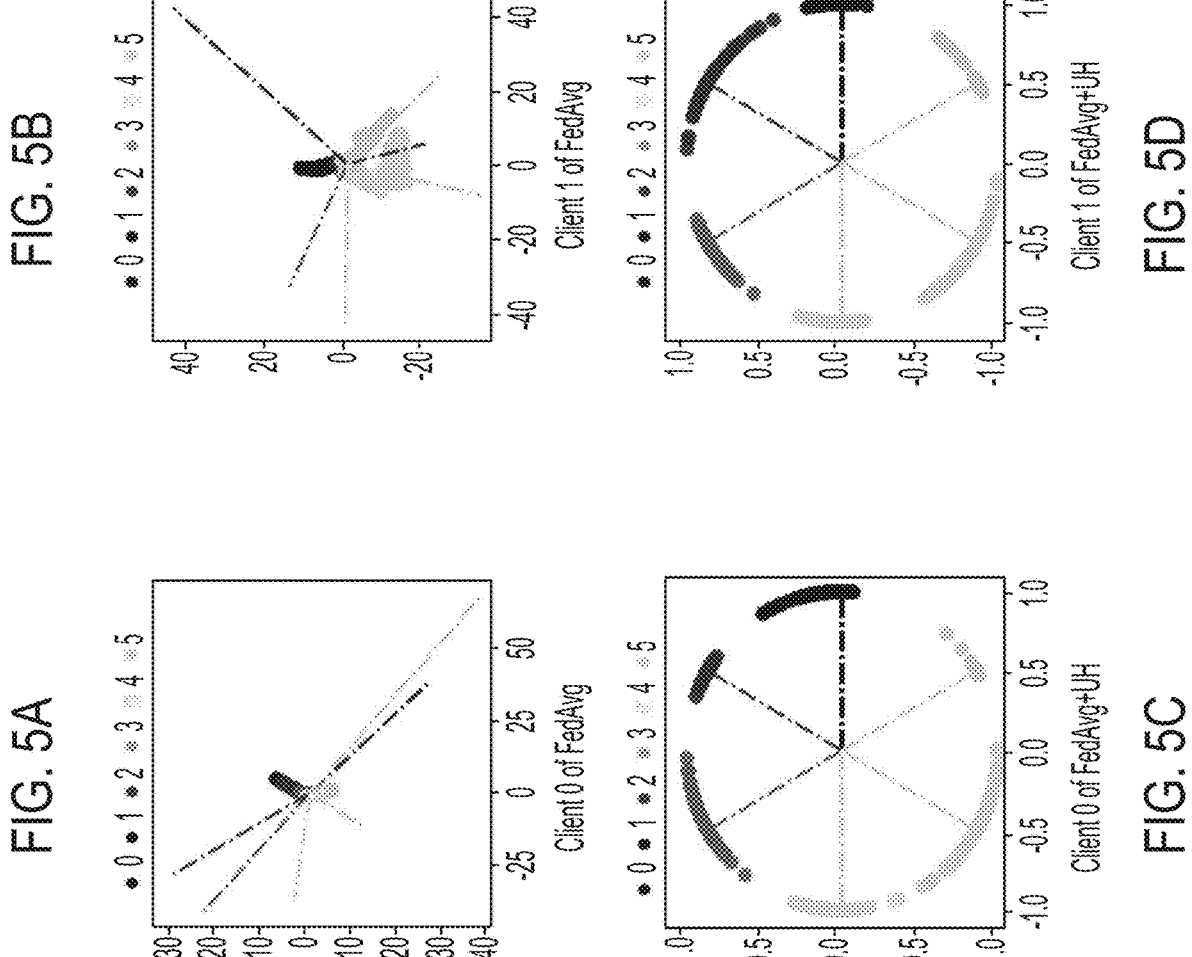
FIGS. 5A-5D illustrate exemplary learned class representations according to some embodiments.

FIGS. 5A-5D illustrate exemplary learned class representations according to some embodiments. FIG. 5A illustrates latent representations and class prototypes trained by an exemplary client (client 0) which has imbalanced classes. As shown, the dominant class has skewed the representation of data in the latent representation space to classify much more of the space to the dominant class. Likewise, FIG. 5B illustrates latent representations and class prototypes trained by a different exemplary client (client 1) which has different imbalanced classes than client 1. As the prevalence of different classes for client 1 are different than for client 0, the class prototypes have been trained differently and have spread throughout the representation space in a different pattern than for client 0. As such, these models have diverged from each other, and a naive combining of the two models would not provide the most accurate classification of all classes.

FIG. 5C illustrates latent representations which are output by a neural network body which is trained on the same imbalanced training dataset as FIG. 5A, however with fixed class prototypes which have been initialized uniformly spaced in the representation space. Likewise, FIG. 5D illustrates latent representations which are output by a neural network body which is trained on the same imbalanced training dataset as FIG. 5B, with fixed class prototypes which have been initialized uniformly spaced in the representation space. As shown, even with imbalanced datasets, with different dominant classes in each, the fixed class prototypes allowed for the representations to be more uniformly distributed in the representation space, allowing for even non-dominant classes to be represented in such a way that they may be accurately classified.

Example Work Flows

FIG. 6A provides an example logic flow diagram illustrating an example algorithm 600 for a method of federated learning based on the framework shown in FIGS. 1-5. FIG. 6B provides an example pseudo-code segment illustrating a method of federated learning with elements similar to the algorithm 600 in FIG. 6A, according to some embodiments described herein. Elements of FIG. 6B which have corresponding steps in FIG. 6A are numbered likewise. One or more of the processes of method 600 and/or method 650 may be implemented, at least in part, in the form of executable code stored on non-transitory, tangible, machine-readable media that when run by one or more processors may cause the one or more processors to perform one or more of the processes. In some embodiments, method 600 and/or method 650 corresponds to an example operation of the FedNH module 230 (e.g., FIG. 2A).

As illustrated, the method 600 (and similarly method 650) includes a number of enumerated steps, but aspects of the methods may include additional steps before, after, and in between the enumerated steps. In some aspects, one or more of the enumerated steps may be omitted or performed in a different order.

At step 601, a server (e.g., central server 102 of FIG. 1) implementing a global neural network (e.g., global model 104 of FIG. 1) initializes parameters of a body of the global neural network comprising a plurality of layers. As described above, the body may be initialized using a number of different methods.

At step 602, the server initializes a plurality of class prototypes, corresponding to a set of pre-defined class labels generated based on a client training dataset, for the global neural network corresponding to a classification task. As described above, the class prototypes may be initialized by determining vectors associated with the plurality of class prototypes such that the vectors are of equal magnitude, and equidistant in the representation space. This may be done to meet the constraints of Equation (1).

At step 603, the server transmits, to a client device (e.g., client 106 of FIG. 1) implementing a client neural network (e.g., personalized model 108 of FIG. 1), the initialized parameters of the body and the plurality of class prototypes. The specific client device may be selected from a group of available client devices. Client devices may indicate their availability, and the server may select clients in batches for the training process.

At step 604, the server receives, from the client device, updated parameters of a body of a client neural network and respective representations corresponding to the set of pre-defined class labels. The updated parameters may be generated by the client device by initializing a local (personalized) model based on the global parameters and class prototypes, and continuing to train that model locally using local training data. The class prototypes are fixed during the local client training process such that each client is training their models to classify the data with the same class prototypes as discussed above. Averaged class representations may be generated by each client as discussed with respect to Equation (3), using the latent representations of client data.

At step 605, the server updates the parameters of the body of the global neural network based on the updated body parameters from the client neural network. The body parameters may be updated by averaging client parameters. The averaging may be a simple average, or may weight each client in the average. For example, a client with a larger amount of local training data may be weighted more than a client with very little local training data.

At step 606, the server updates the plurality of class prototypes of the global neural network based on the respective representations received from the client device. As discussed above, the prototypes may be updated based on a weighted average of each client's averaged representations at a pre-defined learning rate as discussed with respect to Equation (4). Each client may be weighted based on some client characteristic such as the amount of local training data available to the client. For example, if a client has access to a relatively large amount of local training data, the weight allocated to the client may be relatively greater.

The process of having clients train the model locally, return information, and update the global model as discussed above may be repeated iteratively over time to continuously improve the global model. During each iteration, rather than the central server transmitting the initialized parameters and class prototypes, the current updated versions of the parameters and class prototypes may be transmitted. Client devices may benefit from an updated classification model by having the ability to accurately classify items. Client devices may classify, for example, pictures, heart monitor information, text data, and a variety of other types of data. Classifications may be displayed to a user on a user interface display associated with the client device based on a model output.

Example Results

Figure 8:
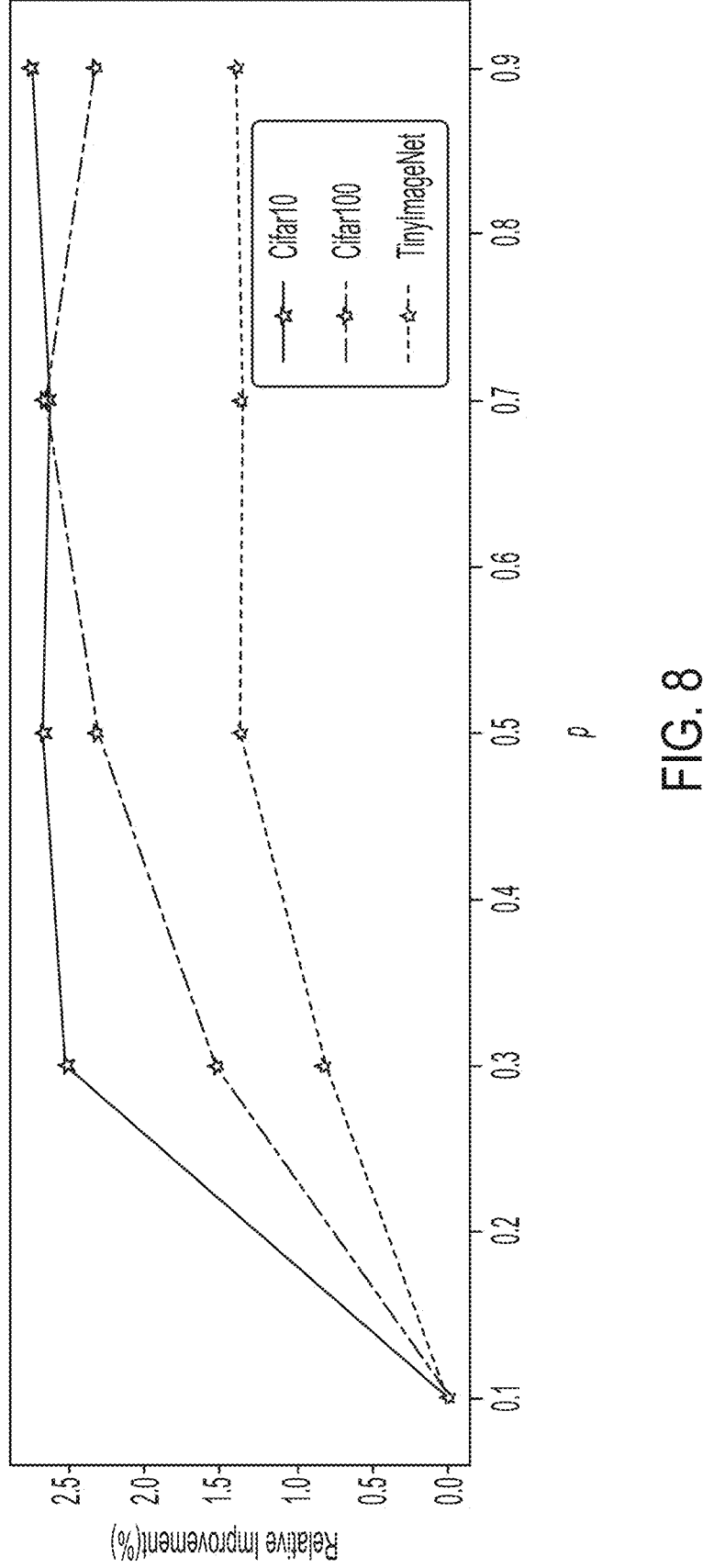

FIGS. 7-9 provide charts illustrating exemplary performance of different embodiments described herein. Experimental results illustrated were performed on Cifar10, Cifar100 as described in Krizhevsky et al., Learning multiple layers of features from tiny images, Technical Report 0, University of Toronto, 2009; and TinyImageNet, a popular image dataset containing 200 image classes, each class having 500 training images and 50 test images. A simple Convolutional neural network was utilized for both Cifar10 and Cifar100 datasets, and the TinyImageNet used Resnet18 as described in He et aL, Deep residual learning for image recognitions, In Proceedings of the IEEE conference on computer vision and pattern recognition, pp. 770-778, 2016. To simulate the heterogeneity with class imbalance, each class is distributed to clients using a Dirichlet($\beta$) distribution with $\beta \in \{0.3, 1.0\}$, resulting in clients having different class distributions and different number of samples. Note that when $\beta \leq 1.0$, each client is likely to have one or two dominating classes while owning a few or even zero samples from the remaining classes. Consequently, both classes and the number of samples are imbalanced among clients. 100 clients were simulated with 10% participation ratio.

The testing accuracy of both global and personalized models is illustrated. Specifically, results of local models take the latest local models as the personalized model for methods that do not explicitly produce personalized models. For personalized federated learning methods that do not upload the head to the server, the head is initialized at the starting point. personalized models are evaluated on a single testing dataset $\mathcal{D}^{\text{test}}$ to reduce the randomness from dataset partitioning. The accuracy of the ith personalized model is computed as $$acc_i = \frac{\left( \Sigma(x_j, y_j) \sim D^{test} \alpha_i(y_j) 1(y_j = \hat{y}_j) \right)}{\Sigma(x_j y_j) - D^{test} \alpha_i y_j},$$

where $\alpha_i(\cdot)$ is a positive-valued function and $1(\cdot)$ is the indicator function. $\gamma_j$ and $\hat{y}_j$ are the true label and predicted label, respectively. The results consider two choices of setting $\alpha_i(\cdot)$. The first choice is to set $\alpha_i(\gamma)= \mathbb{P}(\gamma=c)$, where $\mathbb{P}(\gamma=c)$ stands for the probability that the sample $\gamma$ is from class c in the ith client. The probability $\mathbb{P}(\gamma=c)$ can be estimated from the ith client's training dataset. The second choice sets $\alpha_i(\gamma)$ to 1 if the class $\gamma$ appears in ith client's training dataset and 0 otherwise. This metric measures the generalization ability of personalized models because it treats all classes presented in the local training dataset with equal importance.

An embodiment of the methods described herein is illustrated in the experimental results as FedNH. The baselines used for comparison are popular and state-of-the-art federated learning algorithms, such as FedAvg as described in McMahan et al., Communication-efficient learning of deep networks from decentralized data, In Artificial intelligence and statistics, 1273-1282, 2017; FedPer as described in Arivazhagan et al., Federated learning with personalization layers, arXiv:1912.00818, 2019; Ditto as described in Li et al., Ditto: Fair and robust federated learning through personalization, In International Conference on Machine Learning, 6357-6368, 2021; FedRep as described in Collins et al., Exploiting shared representations for personalized federated learning, In International Conference on Machine Learning, 2089-2099, 2021; FedProto as described in Tan et al., Fedproto: Federated prototype learning across heterogeneous clients, In AAAI Conference on Artificial Intelligence, volume 1, 3, 2022; Fed-BABU as described in Oh, Kim, and Yun, FedBABU: Toward Enhanced Representation for Federated Image Classification, In International Conference on Learning Representations, 2021; FedROD as described in Chen and Chao, On Bridging Generic and Personalized Federated Learning for Image Classification, In International Conference on Learning Representations, 2021; and CReFF as described in Shang et al., Federated Learning on

16

Heterogeneous and Long-Tailed Data via Classifier Re-Training with Federated Features, arXiv:2204.13399, 2022.

FIG. 7 illustrates three types of testing accuracy of embodiments herein. Numbers under the GM column are the averaged testing accuracy for the global model (mean±standard deviation); PM(V) reports the averaged testing accuracy of personalized models by assigning equal weights to all appearing classes (the second choice of setting the weight function $\alpha_i(\cdot)$); PM(L) represents the averaged testing accuracy by assuming the training and testing dataset has the same distribution (the first choice of setting the weight function $\alpha_i(\cdot)$).

As illustrated, personalized models from FedAvg serve as the strong baseline (evaluated under both PM(L) and PM(v) metrics) and can outperform many specialized personalized methods.

In the cross-device setting, the performance gain of the personalized models from FedNH are the most consistent across all tested cases. Further, FedNH has the best PM(V) testing accuracy in almost all cases. Moreover, it adds minimum computation overhead compared with state-of-the-art methods like FedROD.

The PM(V) metric is less sensitive to the class imbalance than PM(L). Note that the accuracy of PM(L) changes significantly from the Dir(0.3) to Dir(1.0), while PM(L) is relatively stable, as shown in FIG. 7.

A strong global model often leads to strong personalized models by comparing the GM and PM metrics Additional tests were performed to validate that prototypes learned by FedNH can capture the class semantics. Experimental results confirmed that semantically similar classes approach each other in the representation space. FedNH learns the semantics of classes by capturing their fine-grained similarities while alternative approaches such as FedAvg simply treat all classes as different.

FIG. 8 illustrates a sensitivity analysis on the smoothing parameter $\rho$ by choosing it from $\{0.1, 0.3, 0.5, 0.7, 0.9\}$ and plotting the relative performance gain over the base case $\rho=0.1$. As shown in FIG. 4, $\rho=0.1$ gives the worst performance. This suggests p cannot be too small.

FIG. 9 illustrates a measure of fairness by computing the standard deviation of the accuracy of personalized models across all clients. A smaller standard deviation indicates that all clients' performance tend to be concentrated around the mean accuracy. FIG. 9 illustrates the result in the form of mean accuracy ±standard deviation. As illustrated, FedNH improves all clients more equally.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a neural-network based classification model, the method comprising:
 initializing, at a server implementing a global neural network, parameters of a body of the global neural network comprising a plurality of layers;
 initializing, at the server, a plurality of class prototypes, corresponding to a set of pre-defined class labels generated based on a client training dataset, for the global neural network corresponding to a classification task;
 transmitting, to a client device implementing a client neural network, the initialized parameters of the body and the plurality of class prototypes;
 receiving, from the client device, updated parameters of a body of a client neural network and respective representations corresponding to the set of pre-defined class labels, wherein the plurality of class prototypes of the global neural network remain fixed during updating of the parameters of the body of the client neural network;
 updating the parameters of the body of the global neural network based on the updated body parameters from the client neural network; and
 updating the plurality of class prototypes of the global neural network based on the respective representations received from the client device.

2. The method of claim 1, wherein the updating the plurality of class prototypes includes:
 averaging respective representations received from a plurality of client devices to provide a set of averaged representations associated with the set of pre-defined class labels; and
 updating the plurality of class prototypes to approach the averaged representations based on a pre-defined learning rate.

3. The method of claim 2, wherein the averaging includes weighting the contribution of each representation based on the associated client device.

4. The method of claim 3, wherein the weighting is determined based on an amount of training data used by the respective client devices.

5. The method of claim 1, wherein the initializing the plurality of class prototypes includes:
 determining vectors associated with the plurality of class prototypes such that the vectors are of equal magnitude, and equidistant in the representation space.

6. The method of claim 1, further comprising:
 selecting a subset of a set of client devices based on an availability indication from respective client devices, wherein the transmitting to the client device is performed based on the selected subset.

7. The method of claim 1, further comprising:
 repeating iteratively the steps of transmitting, receiving, updating the parameters, and updating the plurality of class prototypes,
 wherein each iteration is performed with a different client device or batch of client devices.

8. A system for training a neural-network based classification model, the system comprising:
 a memory that stores a global neural network and a plurality of processor executable instructions; and
 one or more hardware processors that read and execute the plurality of processor-executable instructions from the memory to perform operations comprising:
  initializing parameters of a body of a global neural network comprising a plurality of layers;
  initializing a plurality of class prototypes, corresponding to a set of pre-defined class labels generated based on a client training dataset, for the global neural network corresponding to a classification task;
  transmitting, to a client device implementing a client neural network, the initialized parameters of the body and the plurality of class prototypes;
  receiving, from the client device, updated parameters of a body of a client neural network and respective representations corresponding to the set of pre-defined class labels, wherein the plurality of class prototypes of the global neural network remain fixed during updating of the parameters of the body of the client neural network;
  updating the parameters of the body of the global neural network based on the updated body parameters from the client neural network; and
  updating the plurality of class prototypes of the global neural network based on the respective representations received from the client device.

9. The system of claim 8, wherein the updating the plurality of class prototypes includes:
 averaging respective representations received from a plurality of client devices to provide a set of averaged representations associated with the set of pre-defined class labels; and
 updating the plurality of class prototypes to approach the averaged representations based on a pre-defined learning rate.

10. The system of claim 9, wherein the averaging includes weighting the contribution of each representation based on the associated client device.

11. The system of claim 10, wherein the weighting is determined based on an amount of training data used by the respective client devices.

12. The system of claim 8, wherein the initializing the plurality of class prototypes includes:
 determining vectors associated with the plurality of class prototypes such that the vectors are of equal magnitude, and equidistant in the representation space.

13. The system of claim 8, further comprising:
 selecting a subset of a set of client devices based on an availability indication from respective client devices, wherein the transmitting to the client device is performed based on the selected subset.

14. The system of claim 8, further comprising:
 repeating iteratively the steps of transmitting, receiving, updating the parameters, and updating the plurality of class prototypes,
 wherein each iteration is performed with a different client device or batch of client devices.

15. A non-transitory machine-readable medium comprising a plurality of machine-executable instructions which, when executed by one or more processors, are adapted to cause the one or more processors to perform operations comprising:

initializing parameters of a body of a global neural network comprising a plurality of layers;

initializing a plurality of class prototypes, corresponding to a set of pre-defined class labels generated based on a client training dataset, for the global neural network corresponding to a classification task;

transmitting, to a client device implementing a client neural network, the initialized parameters of the body and the plurality of class prototypes;

receiving, from the client device, updated parameters of a body of a client neural network and respective representations corresponding to the set of pre-defined class labels, wherein the plurality of class prototypes of the global neural network remain fixed during updating of the parameters of the body of the client neural network;

updating the parameters of the body of the global neural network based on the updated body parameters from the client neural network; and updating the plurality of class prototypes of the global neural network based on the respective representations received from the client device.

16. The non-transitory machine-readable medium of claim 15, wherein the updating the plurality of class prototypes includes:

averaging respective representations received from a plurality of client devices to provide a set of averaged representations associated with the set of pre-defined class labels; and updating the plurality of class prototypes to approach the averaged representations based on a pre-defined learning rate.

17. The non-transitory machine-readable medium of claim 16, wherein the averaging includes weighting the contribution of each representation based on the associated client device.

18. The system non-transitory machine-readable medium of claim 17, wherein the weighting is determined based on an amount of training data used by the respective client devices.

19. The non-transitory machine-readable medium of claim 15, wherein the initializing the plurality of class prototypes includes:

determining vectors associated with the plurality of class prototypes such that the vectors are of equal magnitude, and equidistant in the representation space.

20. The non-transitory machine-readable medium of claim 15, further comprising:

selecting a subset of a set of client devices based on an availability indication from respective client devices, wherein the transmitting to the client device is performed based on the selected subset.

\* \* \* \* \*